United States Patent
Yasui

(10) Patent No.: US 11,447,236 B2
(45) Date of Patent: Sep. 20, 2022

(54) ACTUATOR FOR AIRPLANE, METHOD OF DRIVING ACTUATOR FOR AIRPLANE, AND ACTUATOR SYSTEM FOR AIRPLANE

(71) Applicant: NABTESCO CORPORATION, Tokyo (JP)

(72) Inventor: Tsutomu Yasui, Tokyo (JP)

(73) Assignee: NABTESCO CORPORATION, Tokyo (JP)

(*) Notice: Subject to any disclaimer, the term of this patent is extended or adjusted under 35 U.S.C. 154(b) by 343 days.

(21) Appl. No.: 16/844,441

(22) Filed: Apr. 9, 2020

(65) Prior Publication Data

US 2020/0324880 A1 Oct. 15, 2020

(30) Foreign Application Priority Data

Apr. 9, 2019 (JP) .............................. JP2019-074251
Feb. 28, 2020 (JP) .............................. JP2020-033544

(51) Int. Cl.
*B64C 13/50* (2006.01)
*B64D 41/00* (2006.01)
(Continued)

(52) U.S. Cl.
CPC .......... *B64C 13/503* (2013.01); *B64D 41/007* (2013.01); *H02P 6/183* (2013.01);
(Continued)

(58) Field of Classification Search
CPC ...... H02P 21/18; H02P 21/00; H02P 21/0003; H02P 21/14; H02P 21/22; H02P 21/24;
(Continued)

(56) References Cited

U.S. PATENT DOCUMENTS 5,559,419 A * 9/1996 Jansen .................... H02P 21/13
                                                                                       318/807
6,163,127 A * 12/2000 Patel .................... B60L 15/025
                                                                                       318/705

(Continued)

FOREIGN PATENT DOCUMENTS

EP           1863154 A2    12/2007
EP           2429074 A2    3/2012
(Continued)

OTHER PUBLICATIONS

EPO Office Action for corresponding EP Application No. 20168715.9; dated Feb. 11, 2022.
(Continued)

*Primary Examiner* — Antony M Paul
(74) *Attorney, Agent, or Firm* — Cantor Colburn LLP

(57) ABSTRACT

An actuator includes an inverter, a stator, a movable part, a controller, an injector, a current detector, and an estimator. The inverter is driven by a power generated by the axial force of an engine, etc. The stator includes an armature coil driven by the inverter. The movable part applies a driving force to at least one of a rudder surface of a tailplane of the airplane, etc. The controller controls the inverter in accordance with a signal from a maneuvering system. The injector injects a high-frequency signal into the coil. The current detector detects a coil current. The estimator estimates a position of the movable part.

10 Claims, 11 Drawing Sheets

(51) Int. Cl.
  *H02P 6/18*         (2016.01)
  *H02P 27/08*        (2006.01)
  *H02P 21/18*        (2016.01)

(52) U.S. Cl.
  CPC .......... *H02P 27/08* (2013.01); *B64D 2221/00* (2013.01); *H02P 21/18* (2016.02)

(58) Field of Classification Search
  CPC ...... H02P 21/34; H02P 23/00; H02P 23/0004; H02P 21/32; H02P 23/14; H02P 25/022; H02P 25/026; H02P 25/062; H02P 25/064; H02P 25/22; H02P 27/00; H02P 27/04; H02P 27/06; H02P 27/08; H02P 27/085; H02P 27/14; H02P 6/00; H02P 6/005; H02P 6/007; H02P 6/16; H02P 6/18; H02P 6/24; H02P 6/28; H02P 6/32; H02P 9/00; H02P 9/08; H02P 9/36; H02P 1/00; H02P 1/04; H02P 1/24; H02P 1/26; H02P 1/42; H02P 1/46; H02P 1/465; H02P 3/00; H02P 4/00; H02P 5/00; H02P 2101/30; H02P 6/183

See application file for complete search history.

(56) References Cited

U.S. PATENT DOCUMENTS 9,236,821 B2 * 1/2016 Shiota ................ H02P 6/183
2007/0040528 A1 * 2/2007 Tomigashi .............. H02P 21/22
                                                                318/650
2014/0346984 A1 11/2014 Shiota et al.

FOREIGN PATENT DOCUMENTS

| EP | 2924874 A1 | 9/2015 |
| JP | H67877788 A | 7/1995 |
| JP | 2007104738 A | 4/2007 |
| JP | 2011166924 A | 8/2011 |
| JP | 2015532081 A | 11/2015 |

OTHER PUBLICATIONS

JPO Decision of Refusal for corresponding JP Application No. 2019-074251; dated Jan. 14, 2020.

Extended European Search Report for corresonding EP Application No. 20168715.9, dated Aug. 26, 2020.

JPO Notification of Reason(s) for Refusal for corresponding JP2019-074251; dated Sep. 17, 2019.

* cited by examiner

ACTUATOR FOR AIRPLANE, METHOD OF DRIVING ACTUATOR FOR AIRPLANE, AND ACTUATOR SYSTEM FOR AIRPLANE

CROSS REFERENCE TO RELATED APPLICATIONS

The present invention claims priority under 35 U.S.C. § 119 to Japanese Application No. 2019-074251 filed Apr. 9, 2019 and Japanese Application No. 2020-033544 filed Feb. 28, 2020, the entire contents of which are incorporated herein by reference.

BACKGROUND OF THE INVENTION

1. Field of the Invention

The present invention relates to actuators for airplanes, a method of driving actuators for airplanes, and actuator systems for airplanes.

2. Description of the Related Art

Motors driven by an inverter are known. For example, patent literature 1 discloses a three-phase variable speed motor driven by an inverter. The motor includes a three-phase voltage inverter for applying a three-phase voltage to a three-phase motor and a controller for controlling the inverter. The inverter includes a plurality of legs driven by the controller. Each leg includes an upper arm switch and a lower arm switch. The plurality of legs of the inverter are subject to PWM switching.

[Patent literature 1] JP2011-166924

We have gained the following recognition about actuators for airplanes. The fuel economy performance of an airplane can be improved by replacing a related-art hydraulic actuator by an electric actuator such as a motor. By driving a motor in a sensorless manner, the number of components related to detection of the position of the rotor can be reduced and the reliability can be improved. In sensorless driving, the armature coil is driven based on the phase of the rotor detected by referring to the inverse electromotive force. When the motor is stopped, however, the inverse electromotive force is not generated so that the phase of the rotor cannot be detected. The coil is driven and started with a phase irrelevant to the phase of the rotor. If the motor is driven with a phase not irrelevant to the phase of the rotor, the motor may be put into reverse rotation when it is started.

Actuators for airplanes are controlled to output a driving force for a short period of time since the stopped state and to be stopped again. In this control, the driven object moves in the reverse direction and the control is disturbed, if the actuator is put into reverse rotation. For this reason, the actuator for an airplane needs to output a driving force in the normal direction without being put into reverse rotation at start-up.

One conceivable approach to prevent reverse rotation at start-up is to detect the phase of the rotor by referring to the variation of the coil currents in the respective phases occurring when a rectangular high-frequency signal is injected. If a rectangular high-frequency signal is injected, however, high-frequency noise is generated by the coil. A large high-frequency noise may adversely affect an airplane that is controlled by advanced radio equipment.

SUMMARY OF THE INVENTION

In this background, we have recognized that there is room for improvement in actuators for airplanes from the perspective of reducing high-frequency noise.

The present invention addresses the above-described issue, and an illustrative purpose thereof is to provide actuators for airplanes capable of reducing high-frequency noise generated.

An actuator for an airplane according to an embodiment includes: an inverter that is driven by a power of the airplane; a stator including an armature coil energized and driven by the inverter; a movable part that applies a driving force to at least one of a rudder surface of a tailplane of the airplane, a movable surface of a main wing, a landing gear that supports wheels for landing, and a liquid pump through magnetic interaction with the stator; a controller that controls an operation of the inverter in accordance with a command signal from a maneuvering system of the airplane; an injector that injects a high-frequency signal into the coil, the high-frequency signal having a waveform of one of a sinusoidal wave, a trapezoidal wave, a triangular wave, and a staircase wave that varies stepwise between three or more levels; a current detector that detects a coil current flowing through the coil; and an estimator that estimates a position of the movable part based on a component of the coil current detected by the current detector, the component being related to the high-frequency signal.

Optional combinations of the aforementioned and replacement of constituting elements or implementation of the present invention in the form of methods, devices, programs, transitory or non-transitory recording mediums storing programs, systems, etc. may also be practiced as optional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
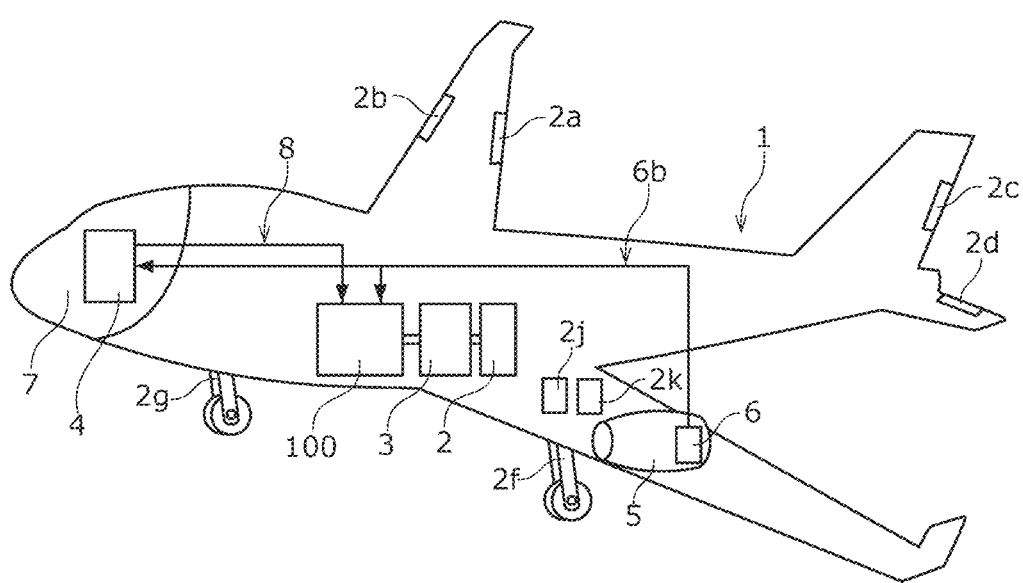
FIG. 1 illustrates an airplane in which the actuator for an airplane according to the first embodiment is installed.

The invention will now be described by reference to the preferred embodiments. This does not intend to limit the scope of the present invention, but to exemplify the invention.

The present invention will be described based on preferred embodiments with reference to the drawings. In the embodiments and variations, the same or equivalent constituting elements and members shall be denoted by the same reference numerals, and duplicative explanations will be omitted appropriately. The dimension of members in the drawings shall be enlarged or reduced as appropriate to facilitate understanding. Those of the members that are not material to the description of the embodiments are omitted in the drawings.

Terms including ordinal numbers like first and second are used to describe a variety of constituting elements, but those terms are used solely for the purpose of distinguishing one constituting element from another and shall not limit the constituting elements.

First Embodiment

Figure 2:
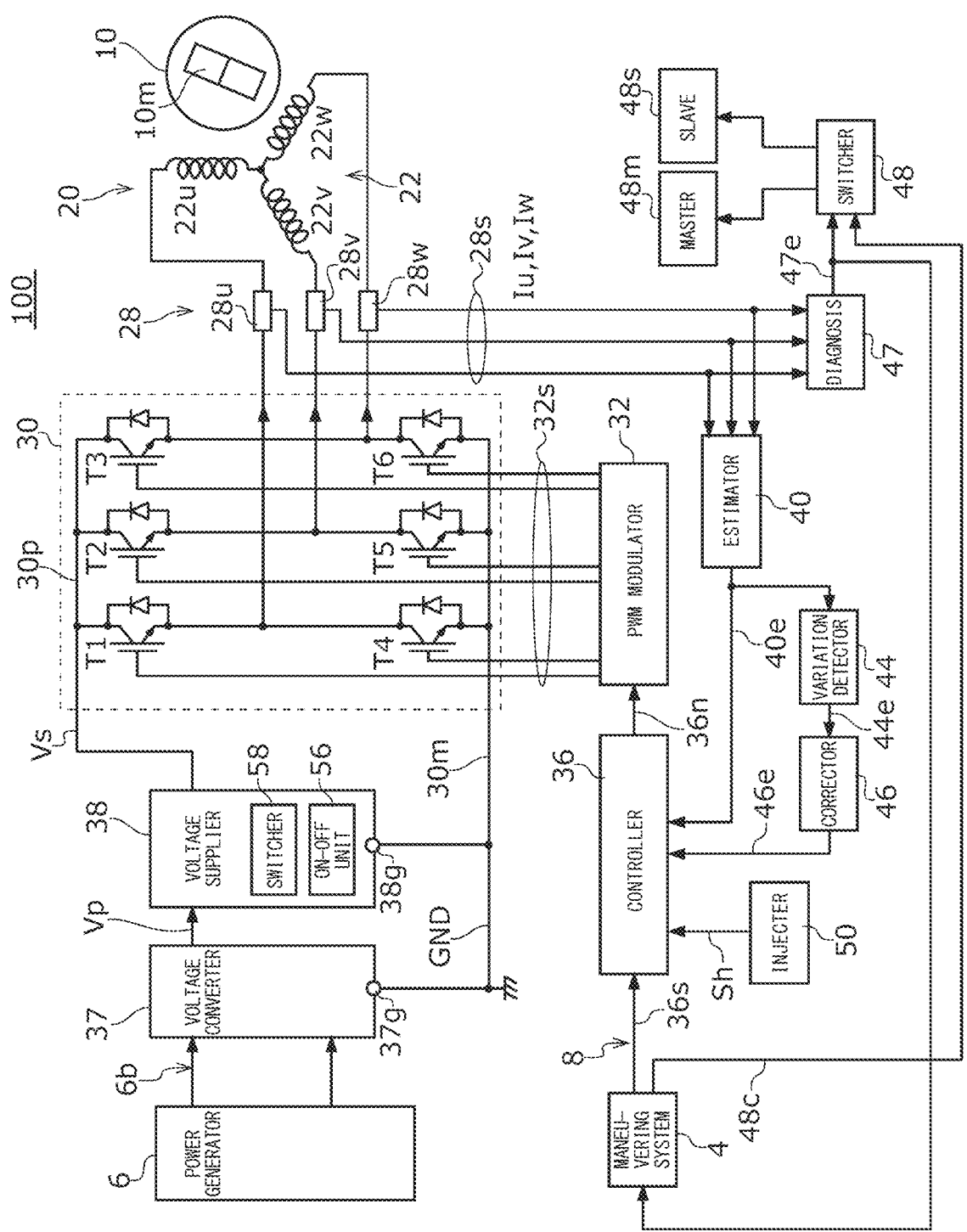
FIG. 2 is a block diagram showing an example of the configuration of the actuator of FIG. 1 for an airplane.

A description will be given of a configuration of an actuator 100 for an airplane according to the first embodiment of the present invention with reference to the drawings. FIG. 1 is a schematic diagram showing how the actuator 100 for an airplane is installed in an airplane 1. FIG. 2 is a block diagram showing an example of the configuration of the actuator 100. The actuator 100 for an airplane is provided in the airplane 1 and is used as an actuator for applying a driving force to a driven object, which is at least one of the rudder surface of the tailplane of the airplane 1, the movable surface of the main wing, the gear that supports the wheels for landing, and the liquid pump.

The movable surface of the main wing is exemplified by an aileron 2a, a flap 2b of the main wing, etc. The rudder surface of the tailplane is exemplified by a rudder 2c, an elevator 2d, etc. of the tailplane, etc. The landing gear that supports the wheels for landing is exemplified by a main gear 2f provided in the main wing, a body landing gear 2g provided in the body, etc. The liquid pump is exemplified by a fuel pump 2j that supplies a fuel to an engine 5, an oil pump 2k that supplies a hydraulic oil to a hydraulic mechanism.

When the actuator 100 is intermittently stopped and activated, a slight time lag may be created in its motion. The time lag may make the motion of a driven object 2 jerky and ultimately impact the attitude of the airplane 1. To address this, the actuator 100 according to the embodiment for driving the movable surface of the main wing or the rudder surface of the tailplane operates continuously while the airplane 1 is flying (e.g., flying horizontally) and stops its operation while the airplane is in a parked state in which the power supply of the airplane is not turned on. The actuator 100 for driving the movable surface of the main wing or the rudder surface of the tailplane may be in operation while the airplane is being parked provided that the power supply of the airplane is turned on.

In this embodiment, the actuator 100 for driving the landing gear operates continuously in a period immediately following takeoff and lasting during climbing flight and in a period lasting during descending flight and until immediately before landing. The operation of the actuator 100 is stopped while the airplane is being parked or flying horizontally. In this case, false operation of the actuator 100 is prevented from occurring while the airplane is being parked or flying horizontally. The actuator 100 for driving the landing gear may operate while the airplane is being parked.

In this embodiment, the actuator 100 for driving the liquid pump may operate continuously while the engine 5 is in operation and stops its operation while the airplane is being parked and the engine 5 is being stopped. In this case, false operation of the actuator 100 is prevented while the engine is being stopped. A separate power supply for operating the actuator 100 while the engine is being stopped will not be necessary. The actuator 100 for driving the liquid pump may operate while the airplane is being parked.

The actuator 100 is driven based on the power of the airplane 1. The power from any of various power supply means can be used as the power of the airplane 1. By way of one example, the power of the airplane 1 may be the power generated by a power generator 6 based on the axial force of the engine 5 of the airplane 1, the power of a battery, the power of an internal auxiliary power supply, the power of a ram-air turbine system, etc. In this embodiment, the power of the airplane 1 is the power generated by the power generator 6. The power of the power generator 6 is supplied via a power line 6b to a large number of electric devices including the actuator 100 of the respective parts in the body of the airplane 1 and a maneuvering system 4 of the airplane 1. If the high-frequency noise generated in the actuator 100 is leaked to the power line 6b, the noise may affect a large number of electronic devices.

The actuator 100 operates in accordance with a command signal from the maneuvering system 4 and outputs a driving force. The maneuvering system 4 is located in a cockpit 7 or in the neighborhood of the cockpit 7 and transmits a command signal to the actuator 100 via a transmission line 8. The transmission line 8 is guided along the wall surface of the body as far as the actuator 100 of the respective parts of the body of the airplane 1. The transmission line 8 is guided over a long distance, and the transmission line 8 passes the neighborhood of a large number of electronic devices. If the high-frequency noise generated in the actuator 100 is leaked to the transmission line 8, the noise may affect a large number of electronic devices.

The actuator 100 drives the driven object 2 via a transmission device 3. By way of one example, the transmission device 3 is comprised of a decelerator (not shown) that decelerates the rotation and a motion converter (not shown) that converts the output rotation of the decelerator into a linear motion. The motion converter is exemplified by a ball screw. Provision of the transmission device 3 is not essential.

When the actuator 100 is activated, the driven object 2 is driven via the decelerator and the motion converter so that the position or attitude of the driven object 2 is changed. By way of one example, the actuator 100 is controlled to perform a driving operation of driving the driven object 2 to change the position or attitude of the driven object 2, or a retention operation of retaining the position or attitude of the driven object 2 Therefore, the rotational angle (rotational position), rotational speed, rotational acceleration of the actuator 100 are controlled so that the actuator 100 is rotated temporarily during the driving operation for changing the position or attitude of the driven object 2 and is not rotated during the retention operation. If the actuator 100 is put into reverse rotation, the driven object 2 is moved in the reverse direction, disturbing the position or attitude thereof. It is therefore desired to drive the actuator so as not to be put into reverse rotation at start-up.

A description will now be given of main features of the actuator 100 with reference also to FIG. 2. The functional blocks depicted in FIG. 2 and elsewhere are implemented in hardware exemplified by electronic devices or mechanical components such as a CPU of a computer, and in software such as a computer program. FIG. 2 depicts functional blocks implemented by the cooperation of these elements. Therefore, it will be understood by those skilled in the art that the functional blocks may be implemented in a variety of manners by a combination of hardware and software.

The actuator 100 mainly include a movable part 10, a stator 20, an inverter 30, an injector 50, a current detector 28, an estimator 40, and a controller 36. The stator 20 includes an armature coil 22 and faces the movable part 10 across a magnetic gap in the radial direction. The movable part 10 has a magnet 10m embedded therein, and the stator 20 and the movable part 10 form an interior permanent magnet motor (IPM motor). In this example, the movable part 10 functions as a rotor rotating relative to the stator 20. In this example, the coil 22 includes coils 22u, 22v, 22w in three-phase start connection. The actuator 100 may be referred to as a three-phase brushless motor or a three-phase synchronous motor.

The movable part 10 applies a driving force to at least one of the rudder surface of the tailplane of the airplane 1, the movable surface of the main wing, the landing gear that supports the wheels for landing, and the liquid pump through magnetic interaction with the stator 20.

The inverter 30 is driven based on the power of the airplane 1. The power generator 6 may be a DC power generator but is an AC power generator in this example. The power generated by the power generator 6 is supplied to a voltage converter 37 associated with the actuator 100 of the respective parts via the power line 6b. The voltage converter 37 rectifies the power supplied from the power generator 6, converts the power into a predetermined DC voltage Vp, and supplies the voltage Vp to a voltage supplier 38. The voltage converter 37 in this example includes a switching regulator. The voltage supplier 38 generates a supply voltage Vs based on the supplied voltage Vp and supplies the voltage Vs to the inverter 30. The voltage supplier 38 in this example includes an on-off unit 56 and a switcher 58. The on-off unit 56 switches between ON and OFF of the supply voltage Vs in accordance with the control by the controller 36. The switcher 58 lowers the supply voltage Vs in accordance with the control by the controller 36.

The supply voltage Vs is supplied to a positive-side power supply line 30p of the inverter 30. Negative-side terminals 37g, 38g of the voltage converter 37 and the voltage supplier 38 are connected to a negative-side power supply line 30m of the inverter 30. The negative-side power supply line 30m is connected to the frame ground of the actuator 100.

The inverter 30 drives the coil 22 to generate a rotating magnetic field in the magnetic gap. The inverter 30 subjects the coil 22 to PWM driving at a carrier frequency fc.

The inverter 30 includes a U-phase leg, a V-phase leg, and a W-phase leg connected between the positive-side power supply line 30p and the negative-side power supply line 30m. The legs include high-side arms T1-T3, respectively, and low-side arms T4-T6, respectively. The high-side arms T1-T3 are connected to the positive-side power supply line 30p, and the low-side arms T4-T6 are connected to the negative-side power supply line 30m.

As a result of one of the high-side arms T1-T3 of the inverter 30 being turned on, the driving current supplied from the positive-side power supply line 30p flows in the coil 22. As a result of one of the low-side arms T4-T6 being turned on, the driving current flows from the coil 22 to the negative-side power supply line 30m.

The arms T1-T6 are power transistors such as metal oxide semiconductor field effect transistors (MOSFET) or insulated gate bipolar transistors (IGBT). These transistors may be made of silicon (Si), silicon carbide (SiC), gallium nitride (GaN), gallium oxide ($Ga_2O_3$), etc.

The injector 50 injects a high-frequency signal Sh into the coil 22 to detect the rotational angle of the movable part 10. FIG. 2 shows that the injector 50 is connected to the controller 36 for convenience, but the embodiment is non-limiting as to the node of injection of the high-frequency signal Sh.

The high-frequency signal Sh will be described. From the perspective of reducing the high-frequency noise generated, the high-frequency signal Sh has a reduced high-frequency waveform in which high-frequency components are reduced as compared with a rectangular wave. High-frequency waves are defined as frequency components of the orders higher than the fundamental wave of the high-frequency signal Sh. In other words, the reduced high-frequency waveform is a waveform having a lower high-frequency wave content percentage than a rectangular wave.

A sinusoidal wave, a triangular wave, a trapezoidal wave, or a staircase wave that varies stepwise between three or more levels can be employed as the reduced high-frequency waveform of the high frequency signal Sh. Stated otherwise, the high frequency signal Sh has a waveform of one of a sinusoidal wave, a trapezoidal wave, a triangular wave, and a staircase wave that varies stepwise between three or more levels In this specification, a sinusoidal wave, a triangular wave, and a trapezoidal wave are not limited to a strictly triangular wave, a strictly trapezoidal wave, and a sinusoidal wave, respectively, and encompass a wave that can be visually identified as a triangular wave, a trapezoidal wave, and a sinusoidal wave.

Figure 8:
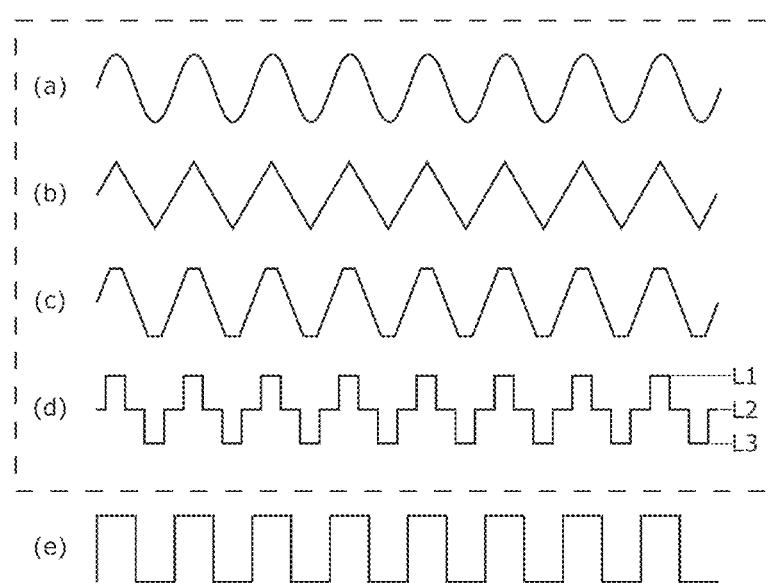
FIG. 8 shows exemplary waveforms of the reduced high-frequency waveform of the high-frequency signal.

FIG. 8 shows exemplary waveforms (a)-(d) of the reduced high-frequency waveform. The exemplary waveform (a) is a sinusoidal waveform, the exemplary waveform (b) is a triangular waveform, the exemplary waveform (c) is a trapezoidal waveform, and the exemplary waveform (d) is an example of a staircase wave that varies stepwise between three or more values. The reduced high-frequency waveforms shown in the exemplary waveforms (a)-(d) can reduce the high-frequency noise of the high-frequency signal Sh. In this embodiment, the high-frequency signal Sh of the injector 50 has a staircase waveform that varies stepwise between three values. For the purpose of reference, a rectangular waveform that is not a reduced high-frequency waveform is shown in the exemplary waveform (e).

Our study has found that, when a high-frequency signal having a large time-derivative value of voltage or current (hereinafter, simply "derivative value") is applied to the coil 22, a large high-frequency noise generated by the coil 22 results. Stated otherwise, it can be said that the high-frequency noise can be reduced by reducing the derivative value of the high-frequency signal Sh. In a waveform such as a rectangular wave or a staircase wave in which the edge varies stepwise, the smaller the amplitude of each step, the smaller the derivative value, and, therefore, the smaller the high-frequency noise, given that the time width of the edge is constant. Accordingly, a staircase wave that varies stepwise between N values (N is an integer such that N>3) can be said to contain smaller high-frequency components than a rectangular wave that varies stepwise between two values. For this reason, the injector 50 according to this embodiment injects a staircase wave that varies stepwise between N values (N is an integer such that N>3) as the high-frequency signal Sh. In this case, the amplitude of each step is smaller than that of a rectangular wave so that the derivative value is decreased, and the high-frequency noise generated is reduced.

The staircase waveform shown in the exemplary waveform (d) of FIG. 8 will be described in further detail. The staircase waveform varies stepwise between three levels including the first level L1, the second level L2, and the third level L3. In this waveform, the duration of the first level L1 may be equal to the duration of the third level L3. Further, the duration of the second level L2 may be equal to, shorter than, or longer than the duration of the first level L1. For example, the duration of the second level L2 may be in a range of ½ times-twice the duration of the first level L1. Our simulation has suggested that the high-frequency content percentage is low in this range.

In this embodiment, the high-frequency signal Sh is a staircase waveform that varies stepwise between three levels including the first level L1, the second level L2 lower than the first level L1, and the third level L3 lower than the second level L2, Defining one period of the high-frequency signal Sh as 100%, the duration of the first level L1 and the duration of the third level L3 are configured to be not less than 10% and not more than 40%.

The frequency fs of the high-frequency signal Sh will be described. If the frequency fs is excessively low, the precision of estimation of the rotational angle of the movable part 10 is lowered. This is addressed by this embodiment by configuring the frequency fs of the high-frequency signal Sh to be higher than the carrier frequency fc of the inverter 30. If the carrier frequency fc of the inverter 30 is 6 kHz-8 kHz, for example, the frequency fs of the high-frequency signal Sh may be 10 kHz or higher. If the frequency fs is excessively high, the operation of the estimator 40 described later cannot catch up and a false operation may result. Our study shows that a false operation is hardly observed in a range of the frequency fs of 100 kHz or lower.

The frequency fs of the high-frequency signal Sh is preferably 10 kHz or higher, and, more preferably, 30 kHz or higher, and, still more preferably, 50 kHz or higher. The frequency fs of the high-frequency signal Sh is preferably 100 kHz or lower. Our simulation has shown that the desired precision of estimation is obtained and the frequency of false operations is of a practical level in this range.

When the movable part 10 is moved by the high-frequency signal Sh injected, the precision of estimation of the rotational angle of the movable part 10 is lowered. This is addressed by this embodiment by controlling the inverter 30 not to cause the movable part 10 to be moved when the high-frequency signal Sh is injected. For example, the movable part 10 is inhibited from being moved by the high-frequency signal Sh, by configuring the amplitude of the high-frequency signal Sh to be small. Alternatively, the movable part 10 is inhibited from being moved by the high-frequency signal Sh, by configuring the frequency fs of the high-frequency signal Sh to be high. Based on these facts, the amplitude and the frequency fs of the high-frequency signal Sh may be set within a range in which the movable part 10 is not moved by injecting the high-frequency signal Sh. The range in which the movable part 10 is not moved may be a range in which it is determined that the movable part 10 is not moved by visual inspection.

A description will now be given of the current detector 28. As shown in FIG. 2, the current detector 28 includes current detection circuits 28u, 28v, 28w for detecting the phase current of the respective phases flowing in the coil 22 of the respective phases. The current detection circuits 28u, 28v, 28w output phase currents Iu, Iv, Iw as detection results. The phase currents Iu, Iv, Iw are generically referred to as detection currents 28s. In other words, the current detector 28 outputs the detection currents 28s as detection results. Any of various current sensors such as a direct current transformer (DCCT), a current sense resistance, etc. can be employed as the current detection circuits 28u, 28v, 28w. The current detection circuits 28u, 28v, 28w of this embodiment are Hall element current sensors that use the Hall effect to convert the magnetic field generated around the current subject to measurement into a voltage. This is advantageous in that an output proportional to the current is obtained over the whole range from a DC current to a high frequency.

The estimator 40 extracts information related to the high-frequency signal Sh from the detection currents 28s (the phase currents Iu, Iv, Iw) of the current detector 28, estimates the rotational angle of the movable part 10, etc. based on the extracted result, and outputs an estimation result 40e. Since the inductance of the respective phases of the coil 22 varies depending on the density of magnetic flux received from the magnet 10m of the movable part 10, it is possible to estimate the rotational phase of the magnet 10m by determining the inductance from the current of the respective phases and by referring to the result of comparing the inductance. The rotational angle of the movable part 10 can be estimated based on the rotational phase of the magnet 10m. The angular acceleration and the angular velocity of the movable part 10 can be estimated by differentiating the rotational angle. The estimator 40 in this example outputs the angular acceleration, the angular velocity, and the rotational angle of the movable part 10 as an estimation result. The angular acceleration, the angular velocity, and the rotational angle are generically referred to as an estimation result 40e. The estimator 40 will be described later.

The controller 36 monitors the phase currents Iu, Iv, Iw and generates a driving waveform 36n of the respective phases based on the estimation result 40e of the estimator 40 (the rotational angle of the movable part 10). The PWM modulator 32 refers to the driving waveform 36n to generate gate driving signals 32s suitable for the respective phases at respective points of time and to switch the arms T1-T6 (power transistors) of the inverter 30. The control scheme of the controller 36 is not limited to any particular type. Rectangular wave driving, sinusoidal wave driving, vector control, etc. are applicable. Of these, vector control involves decomposing the current in the coil 22 of the actuator 100 into a d-axis component and a q-axis component and controlling the components individually. Vector control can be said to be one type of sinusoidal wave driving. Vector control has an advantage in that the control efficiency is high and is often used in high-power applications.

Further, the controller 36 feeds back the estimation result 40e in accordance with a command signal 36s from the maneuvering system 4 of the airplane 1 and controls the actuator 100 accordingly. The controller 36 in this example applies sensorless vector control to the actuator 100. The command signal 36s may be an angular acceleration, an angular velocity, or a rotational angle. Hereinafter, an example in which the command signal 36s is an angular velocity ws will be discussed.

Figure 3:
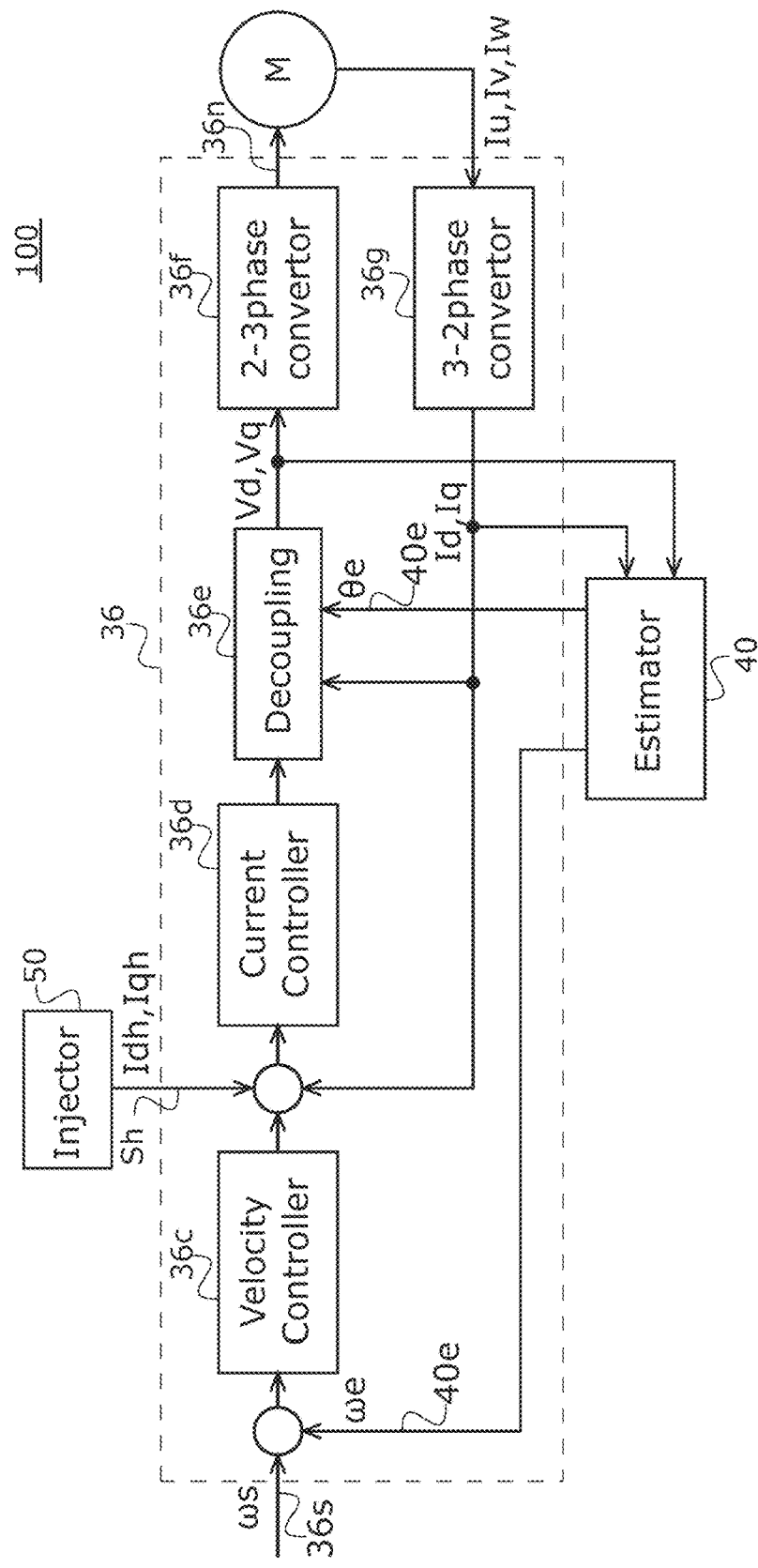
FIG. 3 is a block diagram showing an example of the configuration including the controller of the actuator of FIG. 1 for an airplane and surrounding elements.

FIG. 3 is a block diagram showing an example of the configuration including the controller 36 and surrounding elements. Those of the elements that are not material to the description of the controller 36 are omitted in the drawing. Connecting lines in the drawing do not mean physical connections but direct or indirect coordination between functional blocks. Symbol M represents a set of the stator 20, the movable part 10, the PWM modulator 32, the inverter 30, and the current detector 28 as one block that outputs the detection currents 28s (the phase currents Iu, Iv, Iw) of the current detector 28. A 3-2 phase converter 36g generates a d-axis current Id and a q-axis current Iq from the three phase currents Iu, Iv, Iw.

The estimator 40 estimates an angular acceleration Ae, an angular velocity we, and a rotational angle θe of the movable part 10 from the d-axis current Id, the q-axis current Iq, a d-axis voltage Vd, and a q-axis voltage Vq. A velocity controller 36c determines the driving current based on the result of comparison between the angular velocity ws designated by the command signal 36s and the estimated angular velocity we.

A current controller 36d determines the driving voltage based on the result of comparison between the result of determination by the velocity controller 36c and the d-axis current Id/the q-axis current Iq. An isolator 36e determines the d-axis voltage Vd and the q-axis voltage Vq based on the result of determination by the current controller 36d, the d-axis current Id, the q-axis current Iq, and the estimated rotational angle θe. A 2-3 phase converter 36f generates the three-phase driving waveform 36n based on the d-axis voltage Vd and the q-axis voltage Vq and outputs the waveform to the PWM modulator 32.

For convenience sake, FIG. 3 shows that the injector 50 is connected to the input side of the current controller 36d, but the embodiment is non-limiting as to the node of injection of the high-frequency signal Sh. In the example of FIG. 3, the injector 50 feeds the high-frequency signal Sh to the current controller 36d in the form of a d-axis high-frequency current Idh and a q-axis high-frequency current Iqh. By feeding high-frequency currents in this way, the high-frequency signal Sh is injected into the coil 22.

Figure 4:
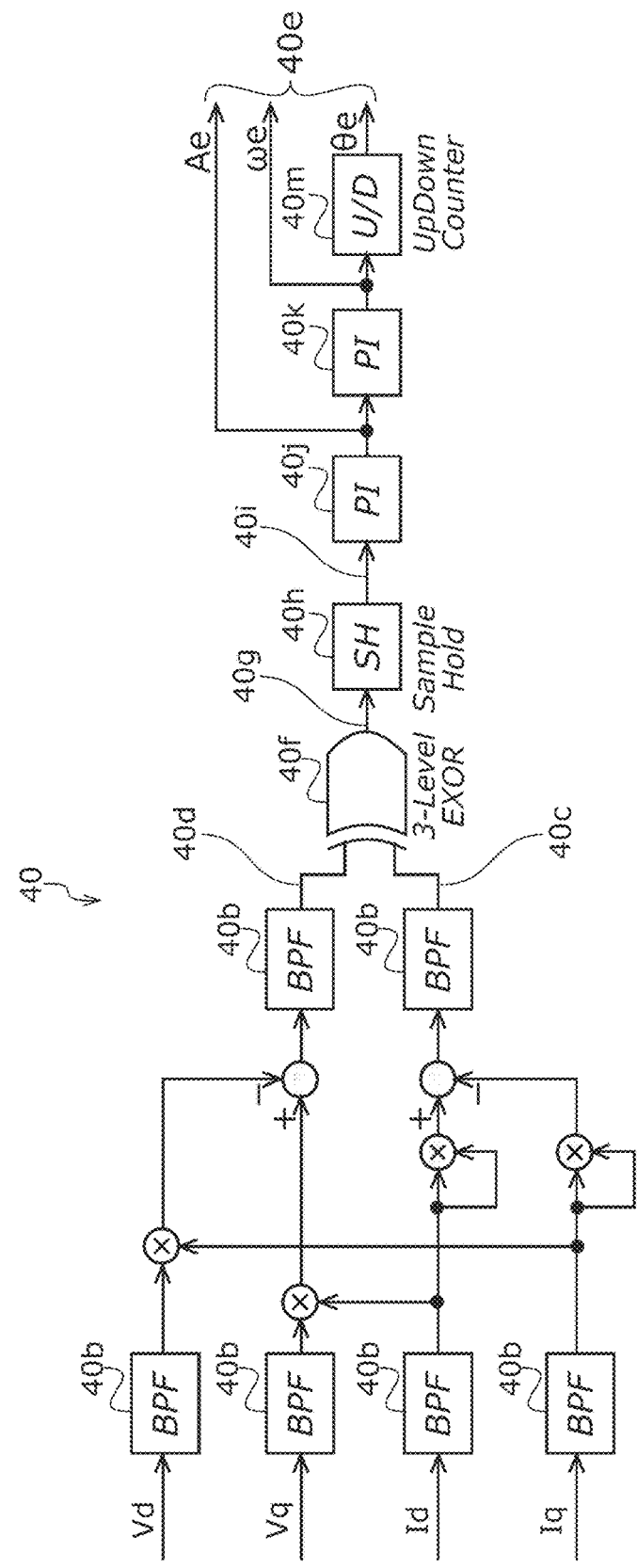
FIG. 4 is a block diagram showing an example of the configuration of the estimator of the actuator of FIG. 1 for an airplane.

A description will be given of the estimator 40. FIG. 4 is a block diagram showing an example of the configuration of the estimator 40. Those of the elements that are not material to the description of the estimator 40 are omitted in the drawing. Connecting lines in the drawing do not mean physical connections but direct or indirect coordination between functional blocks. A description will be given of a method of estimating the rotational angle of the movable part 10 by using phase information on the instantaneous reactive power produced by injecting the high-frequency currents.

In the example of FIG. 4, the estimator 40 estimates the angular acceleration Ae, the angular velocity we, and the rotational angle θe based on the d-axis current Id and the q-axis current Iq that are detected currents, and on the d-axis voltage Vd and the q-axis voltage Vq that are voltage command values. The estimator 40 includes a bandpass filter 40b that extracts frequency components around the high-frequency signal Sh, an EXOR operator 40f, a sample and hold circuit 40h, integrators 40j, 40k, and an up-down counter 40m. The bandpass filter 40b mainly passes components related to the high-frequency signal Sh and removes the DC component (offset) and noise components.

As shown in FIG. 4, the estimator 40 obtains a high-frequency reactive power 40d and a reference phase signal 40c by synthesizing, via a multiplier and an adder, the d-axis current Id, the q-axis current Iq, the d-axis voltage Vd, and the q-axis voltage Vq for which the DC component and noise components are removed by the bandpass filter 40b, and by further removing the offset. Further, the estimator 40 generates an estimated angular acceleration Ae by sampling and holding an exclusive OR 40g of the high-frequency reactive power 40d and the reference phase signal 40c and processing the sampled and held result by the integrator 40j. Further, the estimated angular velocity we is generated by further processing the estimated angular acceleration Ae by the integrator 40k. Further, the estimated rotational angle θe is generated by processing the estimated angular velocity we by the up-down counter 40m.

Figure 5:
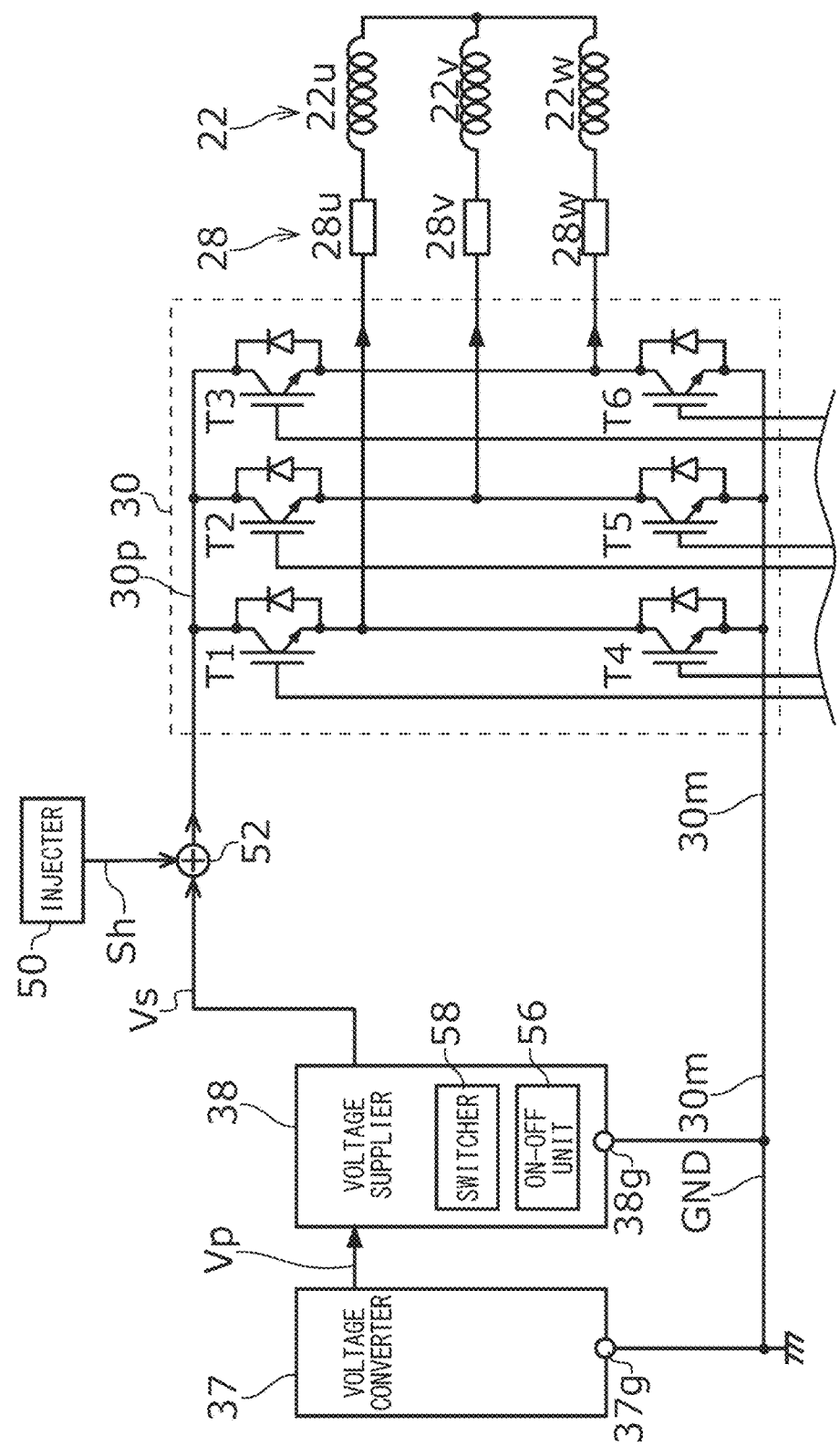
FIG. 5 is a block diagram illustrating the first example of the mode of injection of the high-frequency signal according to the present invention.

A description will be given of a mode of injection of the high-frequency signal Sh. FIG. 5 is a block diagram illustrating the first example of the mode of injection of the high-frequency signal Sh. In the first example, the high-frequency signal Sh is injected into the positive-side power supply line 30p of the inverter 30.

A mixer 52 mixes the high-frequency signal Sh from the injector 50 with the supply voltage Vs. The requirement for the mixer 52 is that it can mix the high-frequency signal Sh, and any of various publicly known configurations can be employed. The mixer 52 in this example mixes the high-frequency signal Sh with the supply voltage Vs by means of a diode (not shown). The mixer 52 is provided between the voltage supplier 38 and the positive-side power supply line 30p and supplies the supply voltage Vs on which the high-frequency signal Sh is superimposed to the positive-side power supply line 30p.

If the voltage of the high-frequency signal Sh is lower than the supply voltage Vs, it is difficult to inject the high-frequency signal Sh. In this embodiment, therefore, the voltage of the high-frequency signal Sh is configured to be higher than the supply voltage Vs.

If the supply voltage Vs is higher than the high-frequency signal Sh, it is difficult to inject the high-frequency signal Sh. Accordingly, the voltage supplier 38 according to this embodiment includes the switcher 58 that lowers the supply voltage Vs supplied to the inverter 30 when the high-frequency signal Sh is injected. For example, the switcher 58 directly supplies the voltage Vp of the voltage converter 37 as the supply voltage Vs when the high-frequency signal Sh is not injected and reduces the supply voltage Vs to be lower than the voltage Vp when the high-frequency signal Sh is injected. For example, the switcher 58 reduces the supply voltage Vs to be lower than the high-frequency signal Sh when the high-frequency signal Sh is injected.

The requirement for the switcher 58 is that it can reduce the supply voltage Vs of the voltage supplier 38, and any of various publicly known configurations can be employed. The switcher 58 in this example is configured to reduce the supply voltage Vs by means of a combination of a semiconductor switch (not shown) and a voltage-dividing circuit (not shown).

From the perspective of facilitating injection of the high-frequency signal Sh, the supply voltage Vs may be turned off when the high-frequency signal Sh is injected. For this purpose, an on-off unit 56 that turns off the supply voltage Vs of the voltage supplier 38 of the inverter 30 when the high-frequency signal Sh is injected is provided in this embodiment. The requirement for the on-off unit 56 is that it can switch between turning on and turning off the supply voltage Vs, and any of various publicly known configurations may be employed. The on-off unit 56 in this example switches between turning on and turning off the supply voltage Vs by means of a semiconductor switch (not shown).

A description will be given of the operation of estimating the rotational angle of the movable part 10 in the stopped state according to the first example.

(1) The supply voltage Vs is turned off by the on-off unit 56 in the stopped state, and the high-frequency signal Sh is injected from the injector 50 into the positive-side power supply line 30p of the inverter 30 via the mixer 52.

(2) In this state, one or two of the high-side arms T1-T3 of the inverter 30 are turned on, and one or two of the low-side arms T4-T6 are turned on. In this process, control is exercised such that the high-side arm and the low-side arm of the leg of a given phase are not turned on simultaneously. A description will be given of a case in which the high-side arms T1, T2 and the low-side arm T6 are turned on.

(3) The high-frequency signal Sh is supplied from the high-side arms T1, T2 that are turned on to the coils 22u, 22v, passes through the coil 22w, and flows from the low-side arm T6 to the negative-side power supply line 30m.

(4) In this process, the current detector 28 detects the current in the coil 22 and outputs the detection currents 28s to the estimator 40.

(5) The estimator 40 estimates the rotational angle of the movable part 10 in accordance with the detection currents 28s and the ON state of the inverter 30 and outputs the estimated rotational angle θe to the controller 36.

(6) The controller 36 determines the driving waveform 36n based on the estimated rotational angle θe. The driving waveform 36n includes information on the arms of the inverter that are turned on and those that are turned off.

(7) The controller 36 turns the supply voltage Vs on to activate the inverter 30 and supplies the driving current to the coil 22 to rotate the movable part 10.

(8) When the movable part 10 is rotated, the inverter 30 may be controlled based on the inverse electromotive force of the coil 22. In this embodiment, however, the high-frequency signal Sh is injected at a predetermined point of time, and the inverter 30 is controlled based on the estimated rotational angle θe estimated by the estimator 40.

Figure 6:
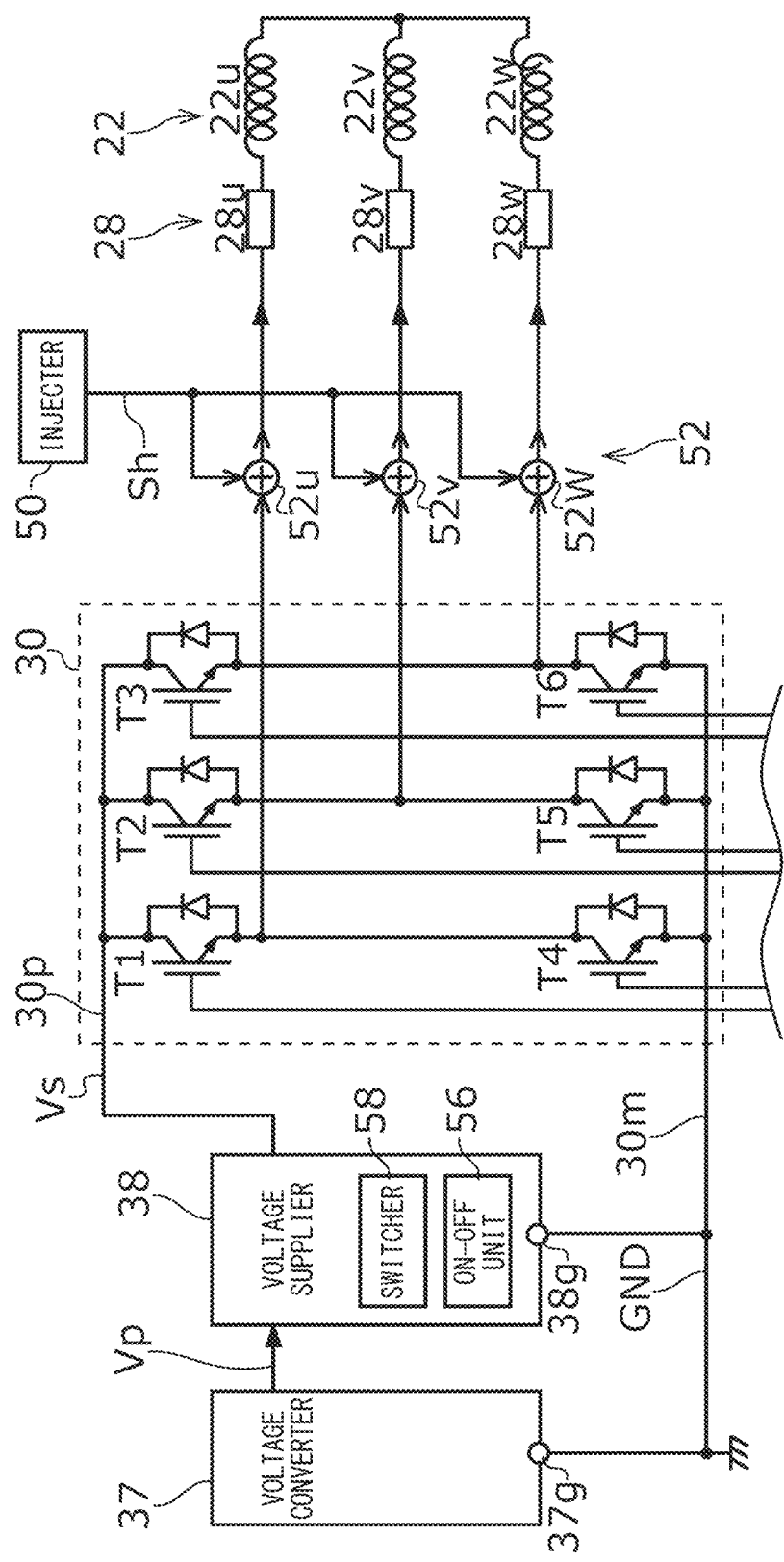
FIG. 6 is a block diagram illustrating the second example of the mode of injection of the high-frequency signal according to the present invention.

A description will be given of the second example of the mode of injection of the high-frequency signal Sh. FIG. 6 is a block diagram illustrating the second example of the mode of injection of the high-frequency signal Sh. In the second example, the high-frequency signal Sh is injected between the inverter 30 and the coil 22. The second example differs from the first example in respect of the configuration of the mixer 52. The configurations of the switcher 58 and the on-off unit 56 are the same as those of the first example. Therefore, a description will be given of the mixer 52 and the difference in operation.

The mixer 52 in this example includes first-third mixers 52u, 52v, 52w corresponding to the U-W phases. In the example of FIG. 6, the first-third mixers 52u, 52v, 52w are respectively interposed between the U-phase leg, V-phase leg, and the W-phase leg of the inverter 30 and the coils 22u, 22v, 22w of the respective phases. The first-third mixers 52u, 52v, 52w inject the high-frequency signal Sh into the coil 22 directly.

In the case the high-frequency signal Sh is injected between the inverter 30 and the coil 22, the high-frequency signal Sh from the injector 50 may interfere with the operation of the inverter 30. In this embodiment, therefore, a part or the whole of the inverter 30 is turned off when the high-frequency signal Sh is injected between the inverter 30 and the coil 22. For example, the high-side arms T1-T3 or the low-side arms T4-T6 of the inverter 30 may be turned off, or both of them may be turned off. In order to secure a current channel of the injected high-frequency signal Sh to the negative-side power supply line 30m, some of the low-side arms may be turned on at a predetermined point of time.

Figure 7:
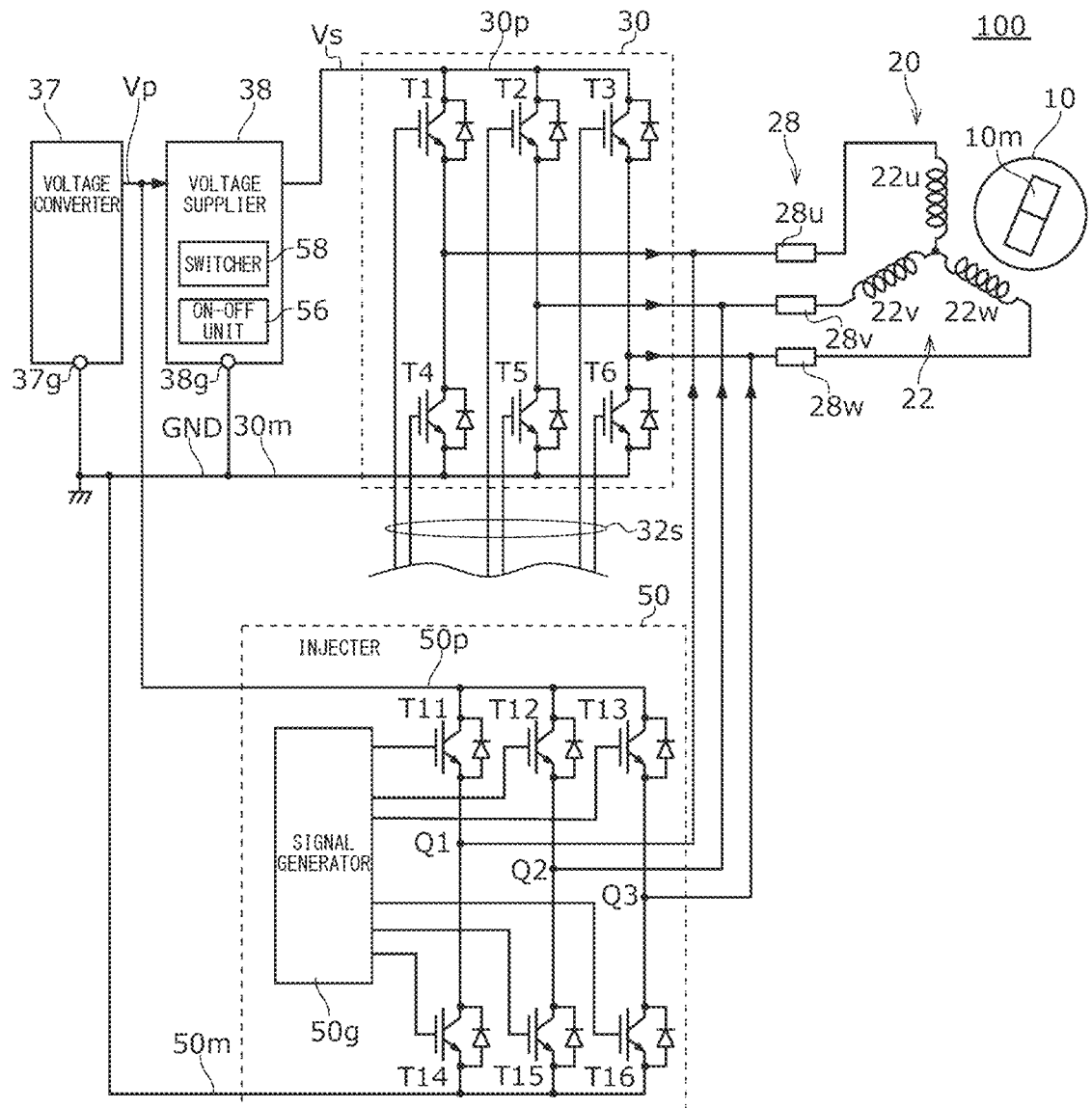
FIG. 7 is a block diagram illustrating the third example of the mode of injection of the high-frequency signal according to the present invention.

A description will be given of the third example of the mode of injection of the high-frequency signal Sh. FIG. 7 is a block diagram illustrating the third example of the mode of injection of the high-frequency signal Sh. In the third example, the high-frequency signal Sh is injected into the output of the inverter 30. The configuration and operation of the switcher 58 and the on-off unit 56 of the third example are the same as those of the second example.

As shown in FIG. 7, the injector 50 includes transistors T11, T12, T13, T14, T15, T16, which are different from the transistors of the inverter 30, and a signal generator 50g. The transistors T11-T16 in this example are power transistors. In this example, some of the high-side arms T1-T3 and the low-side arms T4-T6 of the inverter 30 are turned off when the high-frequency signal Sh is injected. The high-frequency signal Sh is injected from the transistors T11-T16 to the coil 22.

The injector 50 includes three legs corresponding to the respective phases. The legs include the high-side transistors T11-T13 connected to a positive-side line 50p and the low-side transistors T14-T16 connected to a negative-side line 50m. Leg output parts Q1-Q3 are provided at the nodes between the emitters of the high-side transistors T11-T13 and the collectors of the low-side transistors T14-T16. The leg output parts Q1-Q3 of the respective phases are connected to the coils 22u, 22v, 22w of the respective phases. The bases of the transistors T11-T16 are connected to the signal generator 50g.

The signal generator 50g generates an original signal for outputting the high-frequency signal Sh of a predetermined waveform from the leg output parts Q1-Q3. Each leg functions as an amplifier for amplifying the original signal generated by the signal generator 50g.

The positive-side line 50p is connected to the voltage converter 37 and is supplied with the voltage Vp. The negative-side line 50m is connected to the negative-side terminal 37g of the voltage converter 37. As a result of the bases of the transistors T11-T16 being driven by the signal generator 50g, the high-frequency signal Sh of a staircase waveform that varies stepwise between three levels including the first level L1, the second level L2, and the third level L3 is output to the leg output parts Q1-Q3. The high-frequency signal Sh is injected into the coil 22u, 22v, 22w.

The transistors T11-T16 are power transistors such as metal oxide semiconductor field effect transistors (MOSFET) or insulated gate bipolar transistors (IGBT). These transistors may be made of silicon (Si), silicon carbide (SiC), gallium nitride (GaN), gallium oxide ($Ga_2O_3$), etc. The transistors T11-T16 may be of the same type as the arms T1-T6.

In the case the high-frequency signal Sh is injected into the output of the inverter 30, the high-frequency signal Sh from the injector 50 may interfere with the operation of the inverter 30. In this embodiment, therefore, a part or the whole of the inverter 30 is turned off when the high-frequency signal Sh is injected into the output of the inverter 30. For example, the high-side arms T1-T3 or the low-side arms T4-T6 of the inverter 30 may be turned off, or both of them may be turned off. In order to secure a current channel of the injected high-frequency signal Sh to the negative-side power supply line 30m, some of the low-side arms may be turned on at a predetermined point of time.

A description will be given of a variation detector 44 and a corrector 46 with reference to FIG. 2. The estimation result 40e of the estimator 40 may contain an error caused by a slight variation or noise in the power supply. The error may affect the attitude of the airplane 1 via the motion of the driven object 2. In this background, the actuator 100 according to this embodiment is provided with a variation detector 44 that monitors the estimation result 40e of the estimator 40 and detects an abnormality in the estimation result 40e, and a corrector 46 that corrects the estimation result 40e based on the detection result 44e of the variation detector 44.

The variation detector 44 monitors the estimation result 40e and detects an abrupt variation of the estimation result 40e beyond a predetermined range. For example, the variation detector 44 may generate a model by learning the variation pattern of the estimation result 40e during normal operation by machine learning. The variation detector 44 may use the model to determine a rate of deviation of the estimation result 40e from the variation pattern during normal operation and determines that an abnormality occurs if the rate of deviation exceeds a threshold value.

When the variation detector 44 detects an abnormality in the estimation result 40e, the corrector 46 generates a correction value 46e for correcting the estimation result 40e. The corrector 46 superimposes the correction value 46e on the estimation result 40e to mitigate the abnormal variation of the estimation result 40e. As a result, the impact on the attitude of the airplane 1 caused by the abnormality in the estimation result 40e can be reduced.

A description will be given of a diagnosis 47 with reference to FIG. 2. The actuator 100 is provided with the diagnosis 47 for self-diagnosis. By way of one example, the diagnosis 47 transmits, to the maneuvering system 4, a result of diagnosing the state of the actuator 100 by referring to the coil currents Iu, Iv, Iw detected by the current detector 28. The diagnosis 47 monitors the pattern of variation of the coil currents Iu, Iv, Iw and makes a diagnosis to determine whether the pattern of variation of the currents is within a normal range. For example, the diagnosis 47 may generate a model by learning the variation pattern of the currents during normal operation by machine learning. The diagnosis 47 may use the model to determine a rate of deviation of the variation pattern of the currents from the variation pattern during normal operation and determines that an abnormality occurs if the rate of deviation exceeds a threshold value. The diagnosis 47 transmits, to the maneuvering system 4, one of the rate of deviation and the determination result as a diagnosis result 47e. The maneuvering system 4 can perform a predetermined operation in accordance with the diagnosis result 47e. For example, the maneuvering system 4 supplies a switch command signal 48c to the switcher 48 in accordance with the diagnosis result 47e.

A description will now be given of the switcher 48 with reference to FIG. 2. It is desired to configure each component of the actuator 100 to be a redundant system from the perspective of reducing the failure rate of the actuator 100. In the actuator 100, each component is configured as a redundant system comprised of a master and a slave, which are configured to be switchable. In particular, at least one of the inverter 30, the armature coil 22, the movable part 10, the controller 36, the injector 50, the current detector 28, and the estimator 40 of the actuator 100 is configured as a redundant system comprised of a master and a slave.

Referring to FIG. 2, a master 48m is at least one of the inverter 30, the armature coil 22, the movable part 10, the controller 36, the injector 50, the current detector 28, and the estimator 40 (hereinafter, "master component"). A slave 48s (hereinafter, "slave component") corresponds to the master component of the master 48m and is a component to switch to. In other words, the slave component is a component to back up the master component.

The switcher 48 switches between the master component and the slave component in accordance with the diagnosis result 47e of the diagnosis 47 or the switch command signal 48c from the maneuvering system 4. When the diagnosis result 47e of the diagnosis 47 indicates normal operation, the switcher 48 selects the master component, and the master component of the actuator 100 is put into operation. When the diagnosis result 47e of the diagnosis 47 indicates abnormal operation, the switcher 48 switches to the slave component, and the slave component of the actuator is put into operation. In other words, the actuator 100 can back up each component during abnormal operation.

A description will now be given of the feature of the actuator 100 for an airplane according to the first embodiment of the present invention. The actuator 100 for an airplane includes: an inverter 30 that is driven by a power of an airplane 1; a stator 20 including an armature coil 22 energized and driven by the inverter 30; a movable part 10 that applies a driving force to at least one of a rudder surface of a tailplane of the airplane 1, a movable surface of a main wing, a landing gear that supports wheels for landing, and a liquid pump through magnetic interaction with the stator 20; a controller 36 that controls an operation of the inverter 30 in accordance with a command signal 36s from a maneuvering system 4 of the airplane 1; an injector 50 that injects a high-frequency signal Sh into the coil 22, the high-frequency signal Sh having a waveform of one of a sinusoidal wave, a trapezoidal wave, a triangular wave, and a staircase wave that varies stepwise between three or more levels; a current detector 28 that detects a coil current Iu, Iv, Iw flowing through the coil 22; and an estimator 40 that estimates a position of the movable part 10 based on a component of the coil current Iu, Iv, Iw detected by the current detector 28, the component being related to the high-frequency signal Sh.

According to this configuration, the high-frequency signal Sh having a reduced high-frequency waveform is used so that it is possible to suppress high-frequency noise generated that adversely affects electronic devices in the airplane 1 and to suppress the adverse impact on the airplane 1.

The actuator 100 is configured to operate continuously after start-up. Continuous operation eliminates a time lag caused by restart and enables smooth motion of the driven object 2.

The actuator 100 is configured to stop its operation while the airplane 1 is being parked. The configuration can suppress degradation of the actuator 100 and reduce the failure rate.

The actuator 100 is provided with a diagnosis 47 that transmits, to the maneuvering system 4, a result of diagnosing a state of the actuator based on the coil currents Iu, Iv, Iw detected by the current detector 28. The configuration allows the actuator 100 to make a self-diagnosis of the state of degradation of its parts. The maneuvering system 4 can make a diagnosis result known.

At least one of the inverter 30, the armature coil 22, the movable part 10, the controller 36, the injector 50, the current detector 28, and the estimator 40 of the actuator 100 is configured as a redundant system comprised of a master 48m and a slave 48s. The actuator 100 further includes a switcher 48 that switches between the master 48m and the slave 48s in accordance with a diagnosis result 47e of the diagnosis 47. The redundant configuration of selected components of the actuator 100 reduces the failure rate. The actuator 100 is capable of switching from the master 48m to the slave 48s automatically in accordance with the diagnosis result 47e. Further, in the case the master 48m and the slave 48s operate in synchronization, the switcher 48 can stop the master 48m or the slave 48s in the event of a trouble in one of the master and the slave, in accordance with the diagnosis result 47e of the diagnosis 47. The actuator may not be comprised of the master 48m or the slave 48s. A decision unit having the function to determine to stop the system of the actuator itself without being mediated by the switcher may be used to stop the system of the actuator itself, depending on the diagnosis result 47e of the diagnosis 47.

The actuator 100 is provided with a variation detector 44 that monitors an estimation result 40e of the estimator 40 and detects an abnormality in the estimation result 40e, and a corrector 46 that corrects the estimation result 40e based on a detection result 44e of the variation detector 44. The configuration allows correcting the estimation result 40e and reducing the impact on the attitude of the airplane 1 in the event that the estimation result 40e is abnormal.

The injector 50 of the actuator 100 includes, aside from the inverter 30, further transistors T11-T16, which are connected to the output of the inverter 30, and the high-frequency signal Sh is injected from the further transistors T11-T16 to the coil 22. The configuration allows the high-frequency signal Sh to be injected into the coil 22 directly. Since the high-frequency signal Sh is injected from the further transistors, it is easy to inject the high-frequency signal Sh of a desired level. Since the wiring distance as far as the coil 22 is reduced, leakage of high-frequency noise is reduced.

The amplitude and frequency of the high-frequency signal Sh in the actuator 100 is set such that the movable part 10 is not moved. The configuration prevents a false operation of the actuator 100 caused by the injection of the high-frequency signal Sh.

The frequency of the high-frequency signal Sh in the actuator 100 is configured to be higher than the carrier frequency of the inverter 30. The configuration increases the precision of estimation of the position of the movable part 10 and so can prevent a false operation of the actuator.

The high-frequency signal Sh in the actuator 100 is a staircase waveform that varies stepwise between three levels including the first level L1, the second level L2 lower than the first level L1, and the third level L3 lower than the second level L2. Defining one period of the high-frequency signal Sh as 100%, the duration of the first level L1 and the duration of the third level L3 are configured to be not less than 20% and not more than 40%. The configuration reduces high-frequency noise included in the high-frequency signal Sh.

This completes a description of the first embodiment.

Second Embodiment

Figure 9:
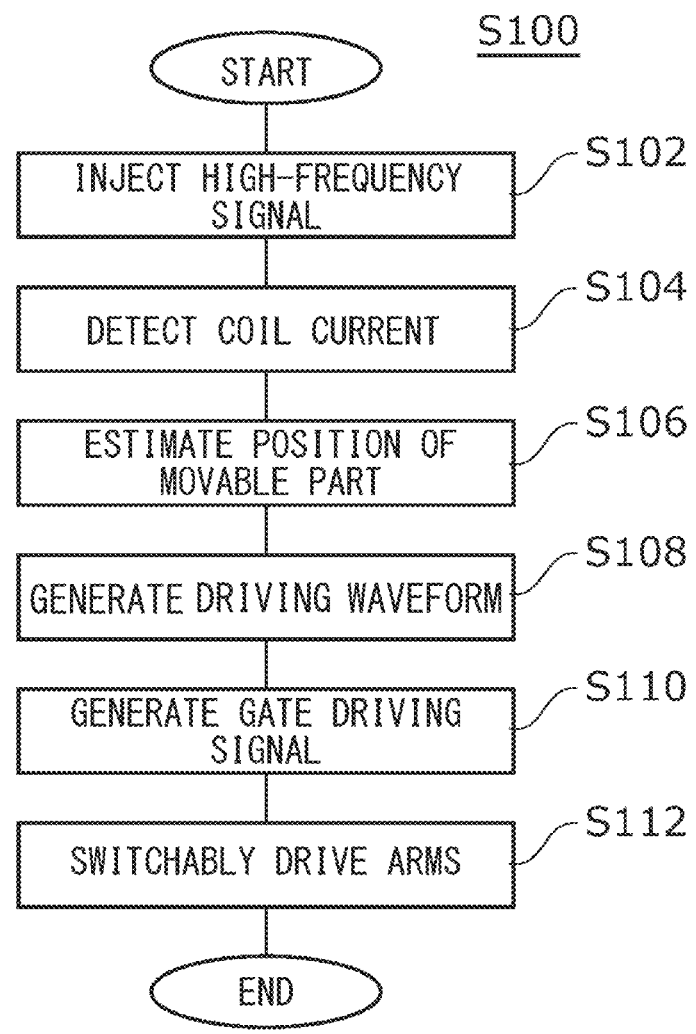
FIG. 9 is a flowchart showing the method of driving the actuator for an airplane according to the second embodiment of the present invention.

A description will now be given of a method S100 of driving the actuator 100 for an airplane according to the second embodiment of the present invention. FIG. 9 is a flowchart showing the method S100 of driving the actuator 100 for an airplane. In the description and drawings of the second embodiment, constituting elements and members identical or equivalent to those of the first embodiment shall be denoted by the same reference numerals. Duplicative explanations are omitted appropriately and features different from those of the first embodiment will be highlighted.

The method S100 of driving according to this embodiment includes: injecting S102 a high-frequency signal Sh to an armature coil 22 of an actuator 100, the high-frequency signal Sh having a waveform of one of a sinusoidal wave, a trapezoidal wave, a triangular wave, and a staircase wave that varies stepwise between three or more levels; detecting S104 a coil current Iu, Iv, Iw flowing through the coil 22; and estimating S106 a position of a movable part 10 based on a component of the coil current Iu, Iv, Iw detected in the detecting S104, the component being related to the high-frequency signal Sh.

The method S100 of driving further includes generating the driving waveform 36n; generating the gate driving signals 32s; and switching S112 the arms T1-T6 of the inverter 30. In the generating S108, the controller 36 monitors the phase currents Iu, Iv, Iw and generates driving waveform 36n of the respective phases based on the rotational angle θe of the movable part 10 estimated in the estimating 106. In the generating S110, the PWM modulator 32 refers to the driving waveform 36n to generate gate driving signals 32s suitable for the respective phases at respective points of time. In the switching S112, the PWM modulator 32 switches the arms T1-T6 of the inverter 30 by using the gate driving signals 32s.

As a result of the arms T1-T6 being switched, the driving current flows in the coil 22, and the actuator 100 for an airplane is driven accordingly. The flow described above is by way of example only. Further steps may be added, some of the steps may be modified or deleted, or the sequence of steps may be reversed.

The second embodiment provides the same advantage and benefit as the first embodiment.

Third Embodiment

Figure 10:
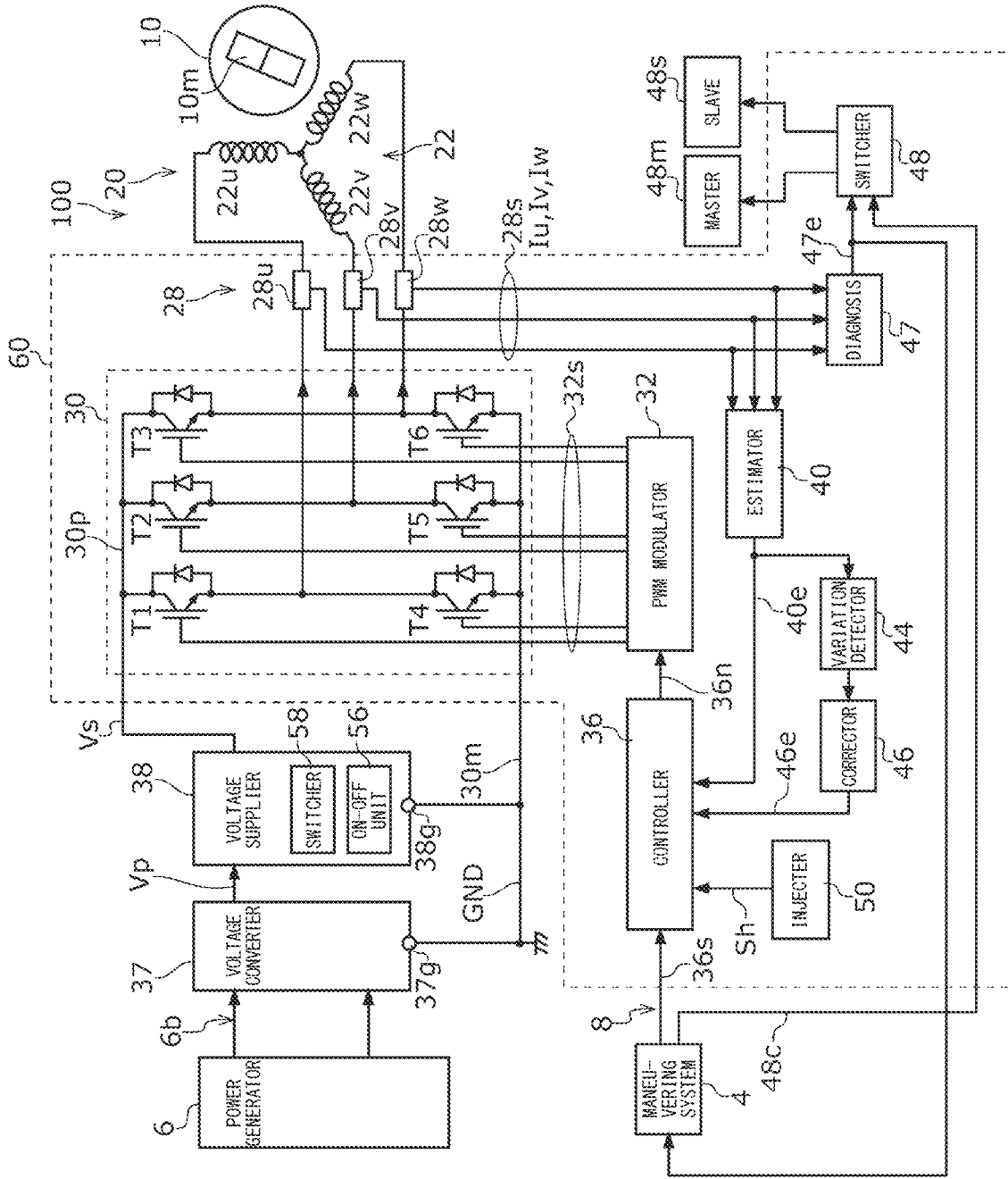
FIG. 10 is a block diagram showing the driver of the actuator for an airplane according to the third embodiment of the present invention.

A description will now be given of a driver 60 of the actuator for an airplane according to the third embodiment of the present invention with reference to FIG. 10. FIG. 10 is a block diagram showing the driver 60. In the description and drawings of the third embodiment, constituting elements and members identical or equivalent to those of the first embodiment shall be denoted by the same reference numerals. Duplicative explanations are omitted appropriately and features different from those of the first embodiment will be highlighted.

The driver 60 is a circuit unit including the inverter 30, the injector 50, the current detector 28, the estimator 40, and the controller 36. The driver 60 can be configured as a driver IC comprised of one chip or a plurality of chips. The driver 60 may further include the variation detector 44 and the corrector 46. The driver 60 may further include the diagnosis 47 and the switcher 48.

The third embodiment provides the same advantage and benefit as the first embodiment.

Fourth Embodiment

Figure 11:
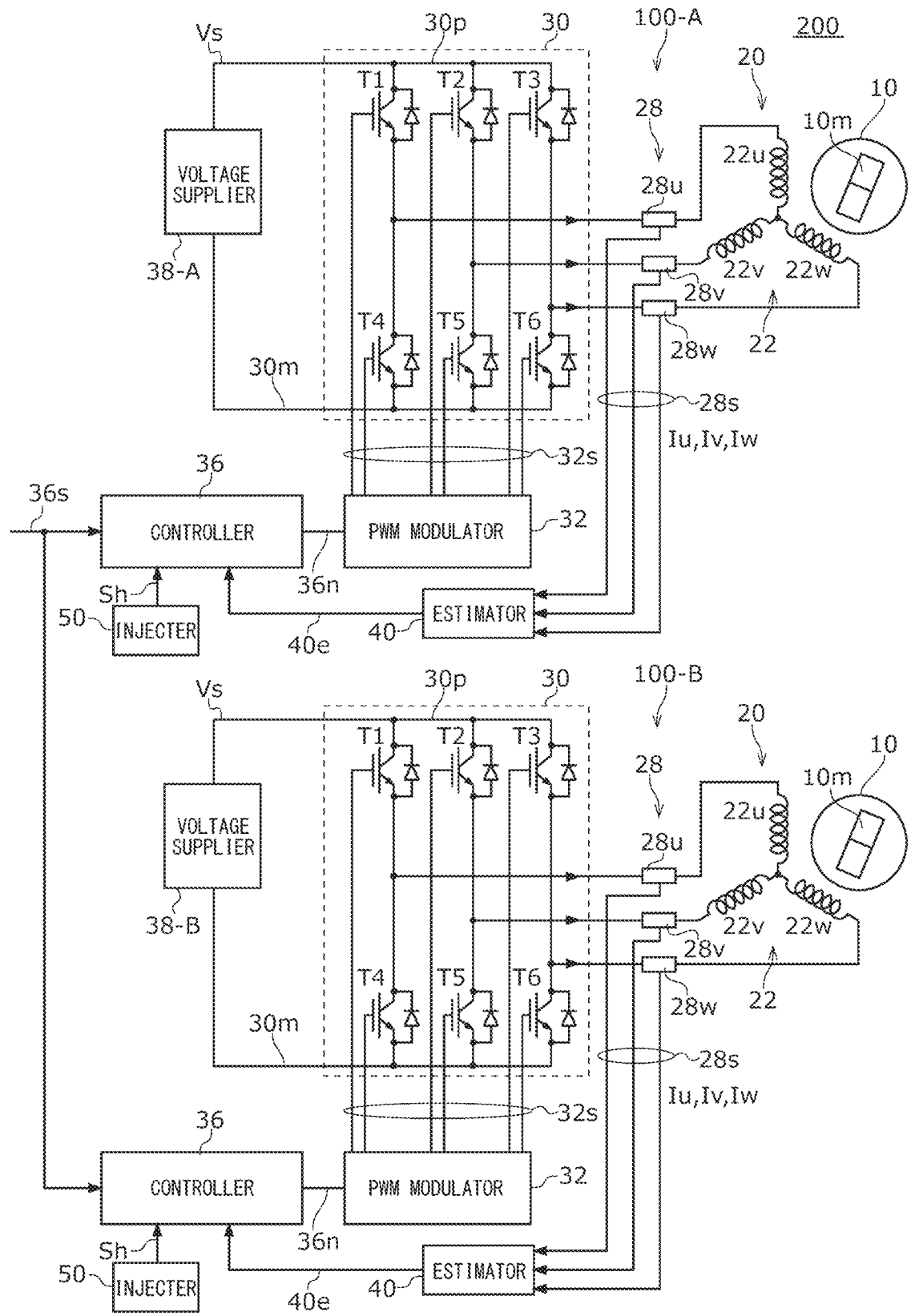
FIG. 11 is a block diagram showing the actuator system for an airplane according to the fourth embodiment of the present invention.

A description will now be given of an actuator system 200 for an airplane according to the fourth embodiment of the present invention with reference to FIG. 11. FIG. 11 is a block diagram showing the actuator system 200 for an airplane. In the description and drawings of the fourth embodiment, constituting elements and members identical or equivalent to those of the first embodiment shall be denoted by the same reference numerals. Duplicative explanations are omitted appropriately and features different from those of the first embodiment will be highlighted. In the description of the fourth embodiment, a plurality of constituting elements are distinguished from each other by adding "-A", "-B" at the end of the symbol.

The actuator system 200 for an airplane includes a first actuator 100-A and a second actuator 100-B that are the actuator 100 for an airplane according to the first embodiment driving a common driven object. The system further includes a first voltage supplier 38-A that drives the first actuator 100-A and a second voltage supplier 38-B that is separate from the first voltage supplier 38-A and drives the second actuator 100-B. The first voltage supplier 38-A and the second voltage supplier 38-B may supply voltages based on the power generated by the axial force of mutually different engines or supply voltages based on the power generated by the axial force of a common engine. Still alternatively, the first voltage supplier 38-A and the second voltage supplier 38-B may supply voltages based on the power of mutually different batteries, etc. or supply voltages based on the power of a common battery, etc.

The first actuator 100-A and the second actuator 100-B may be controlled based on the common command signal 36s from the maneuvering system 4 of the airplane 1 or controlled based on different command signals. The first actuator 100-A and the second actuator 100-B are configured to drive a common driven object via a common transmission apparatus.

The fourth embodiment provides the same advantage and benefit as the first embodiment. In addition, the voltage supplier 38 and the actuator 100 of the fourth embodiment are configured as redundant systems. In the event that one of the voltage suppliers or one of the actuators fails, the other voltage supplier or actuator operates to fulfill the required function so that the failure rate of the system is lowered.

Exemplary embodiments of the present invention are described above in detail. The embodiments described above are merely specific examples of practicing the present invention. The details of the embodiments shall not be construed as limiting the technical scope of the present invention. A number of design modifications such as modification, addition, deletion, etc. of constituting elements may be made to the extent that they do not depart from the idea of the invention defined by the claims. Although the details subject to such design modification are referred to in the embodiments by using phrases such as "of this embodiment" and "in this embodiment", details not referred to as such are also subject to design modification.

Variations

A description will now be given of variations. In the description and drawings of the variations, constituting elements and members identical or equivalent to those of the embodiments shall be denoted by the same reference numerals. Duplicative explanations are omitted appropriately and features different from those of the first embodiment will be highlighted.

In the description of the first embodiment, an example is shown in which the frequency of the high-frequency signal Sh does not vary temporarily and is constant, but the present invention is not limited to this example. For example, the frequency of the high-frequency signal Sh may vary periodically temporarily. By causing the frequency of the high-frequency signal Sh to vary periodically, the frequencies of high-frequency noise are dispersed, and the peak of noise generated in a particular frequency range can be suppressed temporarily.

In the description of the first embodiment, an example is shown in which the movable part 10 is rotated, but the present invention is not limited to this example. For example, the movable part 10 may make a linear motion.

In the description of the first embodiment, an example is shown in which the armature coil 22 is a three-phase, but the present invention is not limited to this example. The armature coil may be a two-phase coil or a coil of four or more phases.

In the description of the first embodiment, an example is shown in which the actuator 100 is a motor of an embedded magnet type, but the present invention is not limited to this example. For example, the actuator may be a motor of a surface magnet type or another type of motor.

In the description of the first embodiment, an example is shown in which the actuator 100 operates continuously while the airplane 1 is flying (e.g., flying horizontally), but the present invention is not limited to this example. The actuator may operate intermittently while the airplane is flying (e.g., flying horizontally). The configuration can suppress degradation of the actuator.

In the description of the first embodiment, an example is shown in which the actuator 100 stops its operation while the airplane 1 is being parked, but the present invention is not limited to this example. The actuator may operate even when the airplane is being parked. This eliminates a time lag caused by restart.

The variations described above provide the same advantage and benefit as the first embodiment.

Any combination of an embodiment and a variation described above will also be useful as an embodiment of the present invention. A new embodiment created by a combination will provide the combined advantages of the embodiment and the variation as combined.

What is claimed is:

1. An actuator for an airplane comprising:
   an inverter that is driven by a power of the airplane;
   a stator including an armature coil energized and driven by the inverter;
   a movable part that applies a driving force to at least one of a rudder surface of a tailplane of the airplane, a movable surface of a main wing, a landing gear that supports wheels for landing, and a liquid pump through magnetic interaction with the stator;
   a controller that controls an operation of the inverter in accordance with a command signal from a maneuvering system of the airplane;
   an injector that injects a high-frequency signal into the coil, the high-frequency signal having a waveform of one of a sinusoidal wave, a trapezoidal wave, a triangular wave, and a staircase wave that varies stepwise between three or more levels;
   a current detector that detects a coil current flowing through the coil; and
   an estimator that estimates a position of the movable part based on a component of the coil current detected by the current detector, the component being related to the high-frequency signal.

2. The actuator for an airplane according to claim 1, further comprising:
   a diagnosis that transmits, to the maneuvering system, a result of diagnosing a state of the actuator based on the coil current detected by the current detector.

3. The actuator for an airplane according to claim 2, wherein
at least one of the inverter, the coil, the movable part, the controller, the injector, the current detector, and the estimator is configured as a redundant system comprised of a master and a slave, and the actuator further comprises a switcher that switches between the master and the slave in accordance with a diagnosis result of the diagnosis.

4. The actuator for an airplane according to claim 1, further comprising:
a variation detector that monitors an estimation result of the estimator and detects abnormality in the estimation result; and
a corrector that corrects the estimation result based on a detection result of the variation detector.

5. The actuator for an airplane according to claim 1, wherein
the injector includes, aside from the inverter, the further transistors connected to an output of the inverter, and the high-frequency signal is injected from the further transistors to the coil.

6. The actuator for an airplane according to claim 1, wherein
an amplitude and frequency of the high-frequency signal is set such that the movable part is not moved.

7. The actuator for an airplane according to claim 6, wherein
a frequency of the high-frequency signal is configured to be higher than a carrier frequency of the inverter.

8. The actuator for an airplane according to claim 1, wherein
the high-frequency signal is a staircase waveform that varies stepwise between three levels including a first level, a second level lower than the first level, and a third level lower than the second level, and, defining one period of the high-frequency signal as 100%, a duration of the first level and a duration of the third level are configured to be not less than 10% and not more than 40%.

9. An actuator system for an airplane comprising:
a first actuator, a second actuator, and a first voltage supplier, and a second voltage supplier, the first actuator and the second actuator being the actuator for an airplane according to claim 1 that drive a common driven object, the first voltage supplier driving the first actuator, and the second voltage supplier being separate from the first voltage supplier and driving the second actuator.

10. A method of driving an actuator for an airplane, comprising:
given an actuator for an airplane including an inverter that is driven by a power of the airplane, a stator including an armature coil energized and driven by the inverter, a movable part that applies a driving force to at least one of a rudder surface of a tailplane of the airplane, a movable surface of a main wing, a landing gear that supports wheels for landing, and a liquid pump through magnetic interaction with the stator, and a controller that controls an operation of the inverter in accordance with a command signal from a maneuvering system of the airplane, injecting a high-frequency signal into the coil, the high-frequency signal having a waveform of one of a sinusoidal wave, a trapezoidal wave, a triangular wave, and a staircase wave that varies stepwise between three or more levels;
controlling the operation of the inverter in accordance with a command signal from a maneuvering system;
detecting a coil current flowing through the coil; and
estimating a position of the movable part based on a component of the coil current detected in the detecting, the component being related to the high-frequency signal.

* * * * *